(12) United States Patent
Georg et al.

(10) Patent No.: US 7,646,131 B2
(45) Date of Patent: Jan. 12, 2010

(54) PERMANENT MAGNET SYNCHRONOUS MACHINE WITH FLAT-WIRE WINDINGS

(75) Inventors: Klaus Georg, Salz (DE); Holger Schunk, Lendershausen (DE); Albrecht Storath, Niederlauer (DE)

(73) Assignee: Siemens Aktiengesellschaft, München (DE)

( * ) Notice: Subject to any disclaimer, the term of this patent is extended or adjusted under 35 U.S.C. 154(b) by 53 days.

(21) Appl. No.: 11/575,034

(22) PCT Filed: Sep. 9, 2005

(86) PCT No.: PCT/EP2005/054501

§ 371 (c)(1), (2), (4) Date: Mar. 9, 2007

(87) PCT Pub. No.: WO2006/029992

PCT Pub. Date: Mar. 23, 2006

(65) Prior Publication Data

US 2008/0036323 A1    Feb. 14, 2008

(30) Foreign Application Priority Data

Sep. 16, 2004   (DE) ...................... 10 2004 044 986

(51) Int. Cl.
*H02K 3/18* (2006.01)
(52) U.S. Cl. .............. 310/216.069; 310/216.071; 310/216.072; 310/216.073; 310/216.074; 310/216.111
(58) Field of Classification Search ................
310/216.069–216.074, 216.111–216.112, 310/154.01
See application file for complete search history.

(56) References Cited

U.S. PATENT DOCUMENTS

| 2,320,866 A | * | 6/1943 | Hill ........................... 310/215 |
| 2,705,292 A | * | 3/1955 | Wagenseil ................ 310/196 |
| 3,566,171 A | * | 2/1971 | Tichy et al. ................ 310/180 |
| 3,868,766 A | * | 3/1975 | Gramlich et al. ............ 29/596 |
| 4,160,926 A | * | 7/1979 | Cope et al. ................. 310/215 |
| 4,278,905 A | * | 7/1981 | Chari et al. ................. 310/52 |
| 4,477,967 A | * | 10/1984 | Yabuoshi et al. ............ 29/596 |

(Continued)

FOREIGN PATENT DOCUMENTS

DE    41 26 019 A1    2/1992

(Continued)

OTHER PUBLICATIONS

Moeller-Werr, Leitfaden der Elektrotechnik, vol. III, Konstruktion elektrischer Maschinen, B.G. Teubner Verlagsgesellschaft, Leipzig, 1950, pp. 42 und 109.

*Primary Examiner*—Quyen Leung
*Assistant Examiner*—Naishadh N Desai
(74) *Attorney, Agent, or Firm*—Henry M. Feiereisen; Ursula B. Day

(57) ABSTRACT

According to the invention, an improved copper filling in the slots (4) of a permanently-stimulated synchronous motor (2) may be achieved, whereby such a motor is disclosed, comprising a stator (1), with parallel-edged slots (4), provided with a winding system of flat wires (5), whereby the flat wires (5) each enclose a tooth (3) and are embodied as a tooth coil (6). The flat wires (5) are wound edgewise such that the narrower side of the flat wire (5) faces the tooth (3) and each tooth coil (6) comprises at least two layers of flat wires (5).

7 Claims, 3 Drawing Sheets

U.S. PATENT DOCUMENTS

| | | | |
|---|---|---|---|
| 4,617,725 A | * | 10/1986 | Holter et al. ................... 29/598 |
| 4,714,576 A | * | 12/1987 | Cotton et al. .............. 264/46.5 |
| 4,816,710 A | * | 3/1989 | Silvaggio et al. ............ 310/194 |
| 4,975,611 A | * | 12/1990 | Rochester ................... 310/194 |
| 5,866,966 A | * | 2/1999 | Fulton ......................... 310/214 |
| 6,069,430 A | * | 5/2000 | Tsunoda et al. ............. 310/180 |
| 6,137,202 A | * | 10/2000 | Holmes et al. .............. 310/180 |
| 6,653,759 B1 | * | 11/2003 | Ward et al. .................. 310/254 |
| 2002/0148099 A1 | * | 10/2002 | Eydelie et al. ................ 29/596 |

FOREIGN PATENT DOCUMENTS

| | | |
|---|---|---|
| EP | 1 016 184 B1 | 7/2000 |
| EP | 1 255 344 A1 | 11/2002 |
| EP | 1 422 806 A | 5/2004 |

\* cited by examiner

PERMANENT MAGNET SYNCHRONOUS MACHINE WITH FLAT-WIRE WINDINGS

BACKGROUND OF THE INVENTION

The invention relates to a permanent magnet synchronous machine with a stator, which has parallel-flanked slots, which are provided with flat-wire windings, the flat-wire winding in each case surrounding a tooth and being in the form of a tooth-wound coil.

In order to reduce skin effects and therefore the amount of heat entering the electrical machine, it is known to wind coils comprising a twisted or stranded conductor bundle comprising individual round wires. Disadvantages here are the increased manufacturing complexity and the reduction in the copper filling factor in the slot of the electrical machine.

In order to avoid the abovementioned disadvantages, the coil can also be produced from copper pressed cable, but this results in increased costs for the coil.

EP 1 255 344 A1 has disclosed a coil arrangement which is constructed from flat wire.

SUMMARY OF THE INVENTION

Against this background, the invention is based on the object of providing a permanent magnet synchronous machine which, with reduced production complexity, has an increased copper filling factor with, at the same time, a comparatively low additional loss factor.

The object set is achieved by virtue of the fact that the flat wires are wound edgewise, with the result that in each case the narrower side of the flat wire points toward the tooth, and each tooth-wound coil has at least two layers of flat wires.

Owing to the arrangement of the flat wire according to the invention, the winding cross section is oriented in particular in the direction of the slot width and only minimally in the direction of the slot height. This results in the skin effect being reduced, which substantially reduces the additional losses in comparison with other winding arrangements. In particular, such tooth-wound coils can be used in the case of open slots pointing in the direction of the drilled stator hole and having parallel-flanked slot pairs, which considerably simplifies the process for fitting the stator with tooth-wound coils.

In the case of stators having a coaxial design, the tooth-wound coils are placed on a star laminate stack from the outside and then positioned in a yoke back.

The flat wires used in each case here can be machined with bending radii which are below the permissible ranges specified in the wire standards.

A design according to the invention is particularly suitable for stators of torque motors, since, inter alia, increased requirements are placed on the compactness of this motor.

For the installation of the permanent magnet synchronous machine, it is advantageous if the tooth-wound coils are positioned or wound onto supports in advance.

The tooth-wound coils with or without supports are positioned on the teeth from the drilled stator hole or, in the case of a two-part stator, from the outside, and fixed in a yoke back.

BRIEF DESCRIPTION OF THE DRAWING

The invention and further advantageous configurations of the invention in accordance with the features of the dependent claims will be explained in more detail below with reference to schematically illustrated exemplary embodiments in the drawing, in which:

DETAILED DESCRIPTION OF PREFERRED EMBODIMENTS

Figure 1:
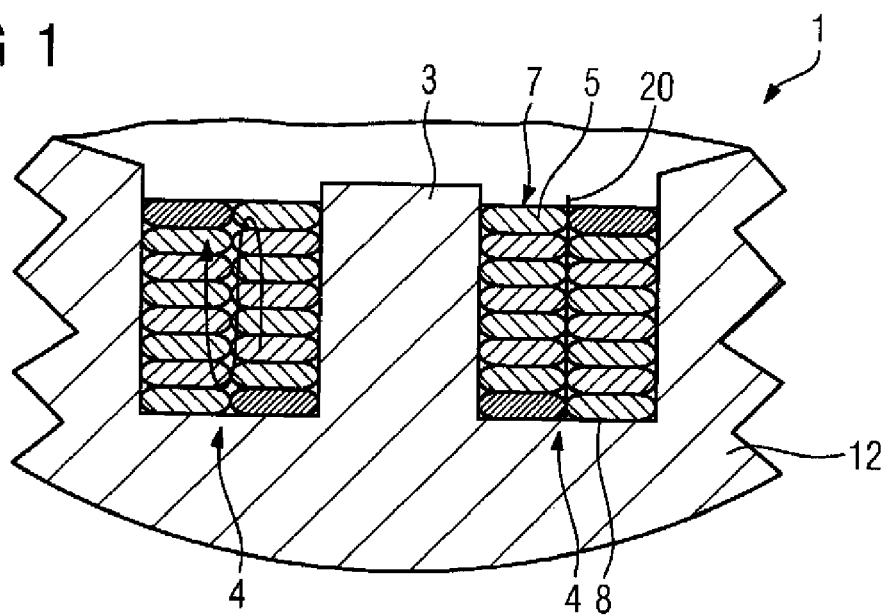
FIG. 1 shows a detail of the flat-wire winding.

FIG. 1 shows a detailed view of a stator 1 of an electrical machine. This detailed view shows a tooth 3 with adjacent slots 4, which are designed to be parallel-flanked. The flat wires 5, which are arranged one above the other and adjacent to one another, are illustrated in the slots 4. A tooth-wound coil 6 having such a design is wound such that the winding layer 7 located directly on the tooth 3 extends from the slot base 8 radially toward the drilled stator hole, and the second layer also extends from the slot base 8 to the drilled stator hole. The adjacent winding layers 7 of the flat wires 5 in one slot can be connected electrically either in series or in parallel. As a result, two different turns numbers can be realized with a flat-wire dimension. In a parallel circuit, as is illustrated in principle in FIG. 2, for example, partial conductor insulation 20 is not absolutely necessary, since the flat wires 5 are designed to have an enamel insulation.

Figure 2:
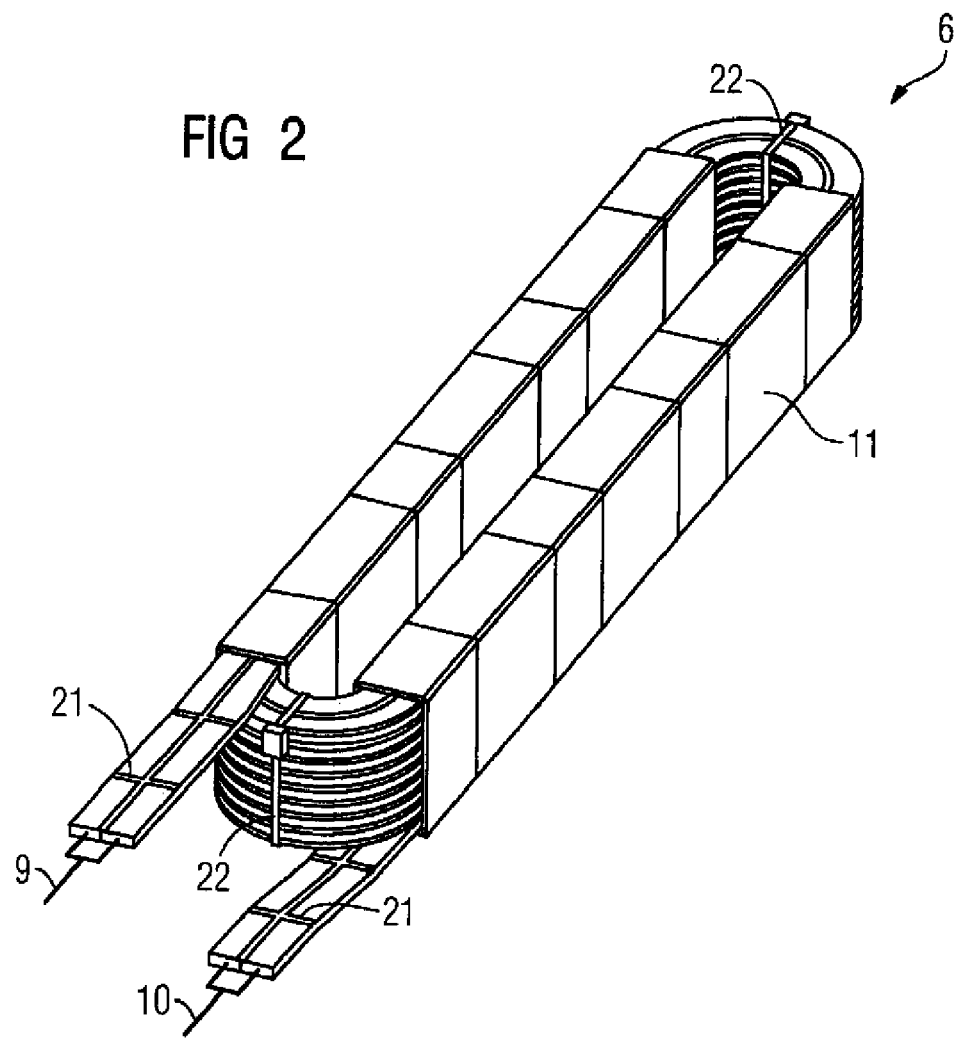
FIG. 2 shows a tooth-wound coil constructed with flat wire.

Such a tooth-wound coil 6, as shown by way of example in FIG. 2, is advantageously machined with bending radii which are below the permissible range prescribed in the wire standards. In the region of the slots 4, the tooth-wound coil 6 has main insulation 11 with respect to the laminated iron core 12 of the stator 1. The start 9 and end 10 of the tooth-wound coil 6 allow for current to pass through this tooth-wound coil 6 with flat wires 5 connected electrically in parallel. The flat wires 5 necessarily have corrugations 21 or are machined in another way, which makes it easier for the tooth-wound coil 6 to be manipulated, for example wound. For the further fixing of the tooth-wound coil 6, means 22 similar to cable ties are used.

If the toothed-wound coil 6 is wound onto a support 23, it is possible to dispense with the main insulation 11 at least on the side facing the tooth 3, since in this case the material of the support 23 already takes on or includes this function.

Figure 3:
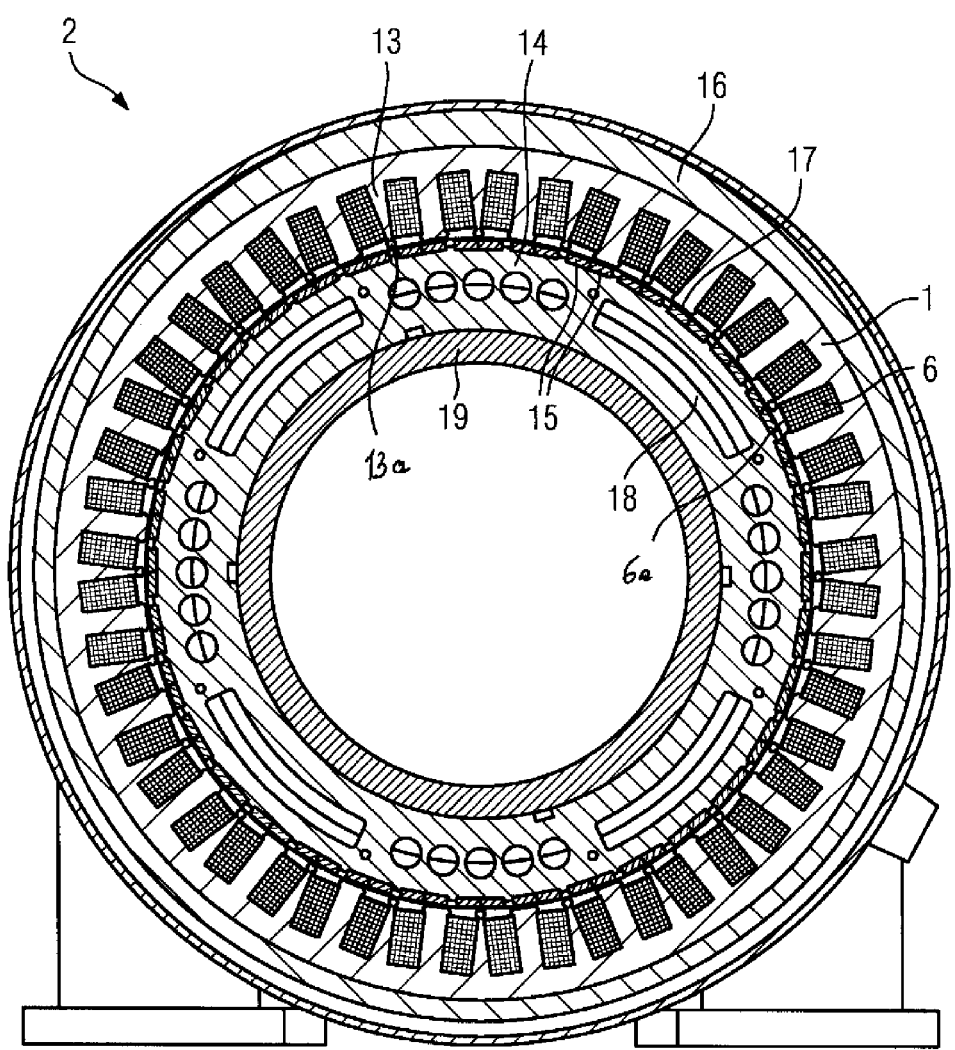
FIG. 3 shows a cross section through an electrical machine with winding according to the invention.

FIG. 3 shows the design of an electrical machine, in particular a permanent magnet synchronous machine 2, in which the stator 1 has teeth 3 with parallel-flanked slots 4 in pairs and the unwound teeth 13, which in each case lie therebetween and are trapezoidal. The stator 1 is inserted into a housing 16. Advantageously, means (not illustrated in any more detail) for cooling the synchronous machine 2 are provided in or on the housing 16. These means are, inter alia, cooling ribs for air cooling purposes or cooling channels, which are located in the housing 16 and are arranged in meandering or helical fashion, for liquid cooling purposes. Permanent magnets 15, which are held by suitable means, for example binding 17, are located on the circumferential surface on the rotor 14. The rotor 14 itself has means for cooling, for example cooling channels 18. FIG. 3 also shows that the wedge-shaped unwound teeth 13 are sized to have a rotor-proximal end 13a extending beyond a rotor-proximal end 6a of the tooth-wound coils 6.

The rotor 14 is, for example, positioned on a spindle 19, which forms part of a production machine or machine tool (not illustrated in any more detail).

Figure 4:
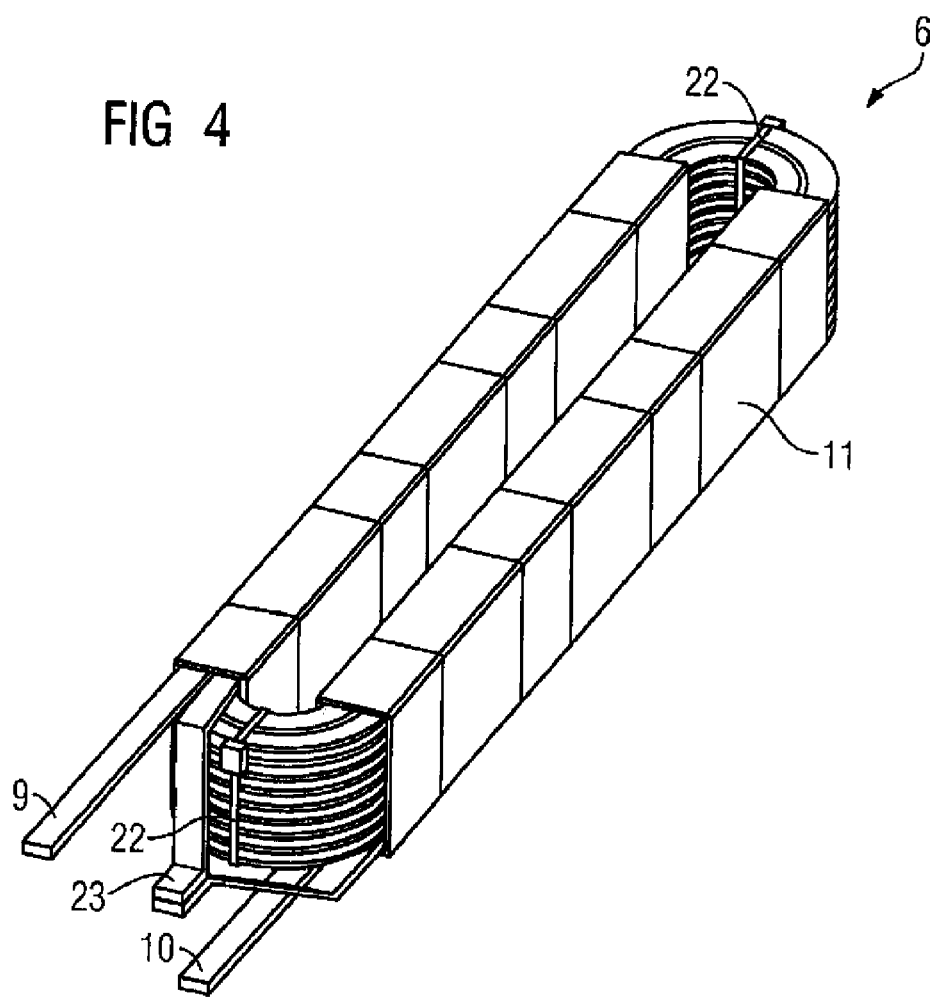
FIG. 4 shows a basic series circuit.

FIG. 4 shows a tooth-wound coil 6, whose flat wires 6, as illustrated as a basic diagram, are connected electrically in series via a connection 23. Owing to the voltage differences now prevailing between the layers, partial conductor insulation 20 is required.

Figure 5:
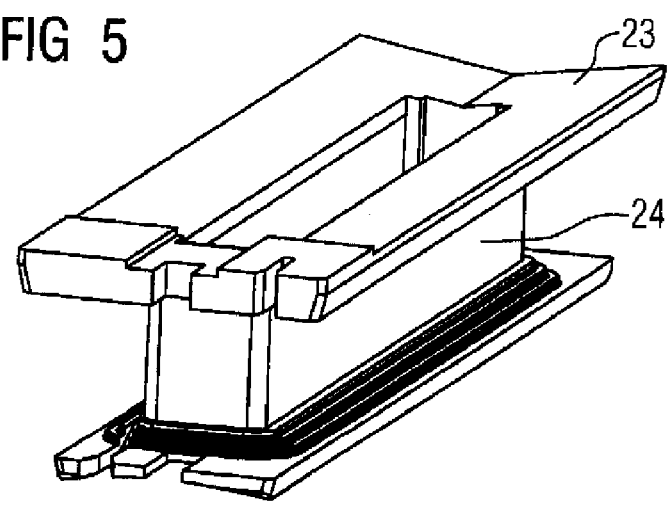
FIG. 5 shows a perspective illustration of a support.

FIG. 5 shows, by way of example, a support 23 in a perspective illustration, which can be provided with flat wires 5. In this case, the inside 24 of the support 23 takes on the function of the main insulation between the flat wires 5 and the tooth 3.

What is claimed is:

1. A permanent magnet synchronous machine, comprising:
   a rotor;
   a stator interacting with the rotor and having a first plurality of rectangular teeth and a second plurality of wedge-shaped teeth arranged in alternating sequence to define parallel-flanked slots disposed in a circular spaced-apart relationship; and
   a winding system provided in the slots and made of flat wires to surround the rectangular teeth in the form of tooth-wound coils, whereas the wedge-shaped teeth remain unwound, thereby implementing an alternating sequence of wound and unwound teeth, said wedge-shaped teeth being sized to have a rotor-proximal end extending beyond a rotor-proximal end of the tooth-wound coils, wherein the flat wires are wound edgewise so that a narrower side of each of the flat wires points toward the tooth, and wherein each tooth-wound coil has at least two winding layers of flat wires in axial side-by-side disposition, with each of the winding layers being stacked radially.

2. The permanent magnet synchronous machine of claim 1, wherein each of the flat wires of each winding layer is wound starting from a slot base.

3. The permanent magnet synchronous machine of claim 1, wherein the slots are each occupied by half a tooth-wound coil.

4. The permanent magnet synchronous machine of claim 1, wherein the stator has a coaxial design.

5. The permanent magnet synchronous machine of claim 1, wherein the tooth-wound coils have a main insulation at least in a region of slot sections in the stator.

6. The permanent magnet synchronous machine of claim 1, further comprising a support, said tooth-wound coil being wound onto the support so that the tooth-wound coil is positionable together with the support on the tooth.

7. The permanent magnet synchronous machine of claim 1, wherein the flat wires of a tooth-wound coil are connectable electrically in parallel or in series.

\* \* \* \* \*